: 3,679,650
Patented July 25, 1972

3,679,650
PROCESS FOR THE PRECIPITATION POLYMERIZATION OF α-METHYLSTYRENES WHICH MAY BE SUBSTITUTED
Herbert Schott, Hofheim, Taunus, and Walter Herwig, Frankfurt am Main, Germany, assignors to Farbwerke Hoechst Aktiengesellschaft vormals Meister Lucius & Bruning, Frankfurt am Main, Germany
No Drawing. Filed Aug. 13, 1970, Ser. No. 63,616
Claims priority, application Germany, Aug. 19, 1969, P 19 42 017.8
Int. Cl. C08f 7/04, 1/08
U.S. Cl. 260—93.5 S    8 Claims

ABSTRACT OF THE DISCLOSURE

A process is disclosed for the precipitation polymerization of α-methylstyrene, which may be substituted, in the presence of a hydrocarbon inert to alkali metals, at least one finely divided alkali metal, a phosphoric acid amide as accelerator and a co-accelerator, at temperatures within the range of from −20° C. to +40° C. The polymers thus are obtained in a grainy, filterable form.

---

The present invention relates to a process for the precipitation polymerization of α-methylstyrenes which may be substituted.

In contradistinction to styrene, α-methylstyrene, when polymerized in the presence of free radicals, only yields low-molecular weight products. High molecular weight homopolymers of α-methylstyrene can be obtained with the use of Friedel-Crafts catalysts, but only when low temperatures are employed (temperatures of −75° C. and below).

Processes in which the polymerization is carried out in the presence of finely divided alkali metals have proved more useful. In these processes, high molecular weight polymers are obtained at temperatures ranging preferably from 0° to 30° C., however, reaction times of more than 10 hours, partly 100 hours and more, are required to obtain high conversions. The reaction times can be shortened by the addition of ethylene glycol dialkyl ethers, cyclic ethers or acetals of oxalkylated phenols as reaction accelerators.

In the afore-described processes, the α-methylstyrene is either polymerized in mass or in solution, which has several disadvantages. In the mass polymerization the removal of an excess amount of the catalyst or of the α-methylstyrene is difficult or must be attained by dissolving, filtering and the subsequent precipitation of the polymer. After the polymer has been separated, large amounts of the solvent mixture have to be worked up. Of course, the same disadvantage is met with when the polymerization is carried out in solution. Finally, in the processes described above the molecular weight of the poly-α-methylstyrene formed can be regulated with difficulty only.

Now we have found a process for the preparation of poly-α-methylstyrenes by polymerizing α-methylstyrene, which may be substituted, by precipitation, the α-methylstyrene corresponding to the formula

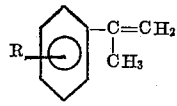

in which R represents H, $CH_3$, $C_2H_5$, $CH(CH_3)_2$, which comprises polymerizing a mixture comprising (1) the monomer,
(2) a hydrocarbon which is inert to alkali metals and in which the poly-α-methylstyrenes do not dissolve or dissolve only to a small degree,
(3) a finely divided alkali metal or a mixture of at least two finely divided alkali metals having a particle size of less than 1 mm. in an amount within the range of from 0.5 to 200 millimoles, preferably 2.0 to 40 millimoles per mole of the monomer,
(4) a phosphoric acid amide corresponding to the formula $O=P[N(R)_2]_3$, in which R represents identical or different alkyl radicals containing 1 to 10 carbon atoms, preferably 1 carbon atom, or aryl or alkaryl radicals containing 6 to 10 carbon atoms, and in which also two radicals bound to one and the same N-atom may form a carbon chain, as accelerator, and
(5) at least one compound of at least one of the following groups as co-accelerator
  (a) ethers corresponding to the formula R—O—R,
  (b) tertiary amines of the formula $NR_2$ or

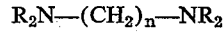

$n$ being an integer from 1 to 6, preferably 2, or tertiary 5- or 6-membered cyclic or heterocyclic mono- or polyvalent amines, in which the N-atom is substituted with R, and
  (c) compounds of trivalent phosphorus of the formula

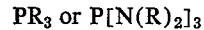

in which R represents identical or different alkyl- or alkenyl radicals containing 1 to 8 carbon atoms, preferably 1 to 4 carbon atoms, or aryl- or alkaryl radicals containing 6 to 10 carbon atoms, at temperatures within the range of from −20° to +40° C., preferably −10° to +30° C.

Monomeric starting compounds to be used in the process according to the invention are compounds corresponding to the formula

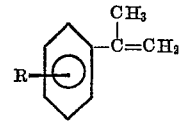

in which R represents H, $CH_3$, $C_2H_5$ or $CH(CH_3)_2$. α-Methylstyrene is preferably polymerized. These compounds should be free from impurities which may react with alkali metals and thus bring about the interruption of the reaction. The best results are obtained when the α-methylstyrene compounds, prior to the polymerization, are distilled in an atmosphere of inert gas with the addition of, for example, $LiAlH_4$ or $Al(iC_4H_9)_3$. In the case of a prolonged storage time, they should be protected from air or oxygen.

The process of the invention is carried out in the presence of solvents which are inert to alkali metals and in which poly-α-methylstyrenes are not soluble or in which they are soluble to a small degree only so that the polymer, when the reaction conditions described below are employed, is obtained in a grainy, i.e. filterable form.

It is, of course, possible also to use mixtures of solvents and non-solvents whereby during the polymerization more or less large amounts of low molecular weight portions, i.e. more readily soluble portions, can be dissolved and separated. As suitable solvents there may be mentioned, for example, paraffin hydrocarbons or mixtures thereof, such as pentane, hexane, heptane, octane, cyclopentane, cyclohexane and light mineral oils. As additives having a dissolving action there may be used, for example, aromatic hydrocarbons, such as benzene, toluene or xylene. The proportion by volume of solvent to monomers can be varied within the range of from 20:1 to 0.5:1, preferably 8:1 to 1:1.

The amount of the alkali metal which is employed as the catalyst may vary within wide limits. Calculated on 1 mole of the amount of the α-methylstyrene to be polymerized, there are employed from 0.5 to 200 millimoles, preferably 2.0 to 40 millimoles. By the amount of the alkali metal employed the molecular weight of the poly-α-methylstyrene formed can be regulated. The other parameters (temperature, amount of phosphoric acid amide, solvent and α-methylstyrene) must, of course, be maintained constant because they also influence the yield and the molecular weight.

The preliminary treatment and the division of the alkali metal play a decisive role in the process according to the invention. In order to achieve that the reaction follows as rapid and quantitative as possible a course, the diameter of the metal particles should be less than 1 mm., generally 0.1 mm. and less. Such finely divided metals can be obtained according to known methods. Metallic sodium can be dispersed, for example, in hot toluene, petroleum, xylene or another inert hydrocarbon by stirring vigorously, however, the liquid metal can also be forced into the hydrocarbons by means of nozzles.

Moreover, the alkali metals can be dissolved in the phosphoric acid amide used as the accelerator or in a mixture composed of the accelerator and part of the co-accelerator and be stirred into the hydrocarbon (cf. Examples 1 to 10), in which case the metal precipitates in a very fine, highly active form. When commercially obtainable alkali metal dispersions are to be used, it is advantageous to etch the metal in, for example, mixtures of heptane and hexamethyl phosphoric acid triamide having a high content of phosphoric acid amide. This etching can be accelerated by the application of elevated temperatures. After dilution with additional amounts of heptane and co-accelerator, a mixture suitable for polymerization is obtained. All operational steps described above have to be carried out with the exclusion of air. In the process according to the invention, all alkali metals may be used, sodium being preferred owing to its easy accessibility, for example as sodium dispersion in mineral oils or aromatic hydrocarbons.

A sodium dispersion in aliphatic hydrocarbons, for example, in heptane, practically does not react with α-methylstyrene at 0° C. α-Methylstyrene is polymerized only when phosphoric acid amides are added as the polymerization accelerator. Suitable compounds according to the formula given under (4) are, for example, hexamethyl phosphoric acid triamide, hexaethyl phosphoric acid triamide, hexa-n-propyl phosphoric acid triamide, hexacyclohexyl phosphoric acid triamide. In case these accelerators are used as such, contrary to the invention, the hydrocarbon/phosphoric acid amide mixture must contain about 5% by volume of said accelerators in order to obtain a yield of poly-α-methylstyrene as high as possible. However, an amount of less than 1.0% by volume of phosphoric acid amide will suffice while obtaining the same good yields, when certain substances are added as co-accelerators which, as such, exhibit no polymerization-accelerating action or which exhibit such an action only to a small degree. As co-accelerators there may be used, for example, dimethyl ether, methyl ethyl ether, diethyl ether, vinyl ethyl ether, di-iso-propyl ether, di-n-butyl-ether, di-iso-butylether, trimethylamine, triethylamine, tri-iso-propylamine, N,N,N',N'-tetramethyl-1,2-diaminoethane, N,N' - dimethyl-N,N'-diethyl-1,2-diaminoethane, N,N,N',N'-tetramethyl-1,2-diamino-propane, N,N,N',N'-tetramethyl-1,4-diaminobutane, N-methylmorpholine, triethyl phosphine, tributyl phosphine, hexamethyl phosphorous acid triamide; compounds preferably used are, vinyl ethyl ether, N,N,N',N'-tetramethyl-1,2-diaminoethane and N-methyl morpholine.

It is advisable to choose the portions of hydrocarbon, accelerator and co-accelerator in a manner such that the mixture contains from 0.05 up to 10% by volume, preferably 0.1 to 5% by volume, of the accelerator and from 0.05 to 30% by volume, preferably 0.9 to 20% by volume of the co-accelerator.

In order to obtain not only a high molecular weight but also a high reaction velocity, it is necessary not to exceed certain temperature limits. The lower temperature limit is determined by the type and the amount of the phosphoric acid amide/co-accelerator mixture. The polymerization should generally be carried out at temperatures above −20° C., since otherwise the reaction velocity would be too low. On the other hand, when the polymerization is carried out at temperatures above +40° C., only low-molecular weight products are obtained, the yield simultaneously decreasing substantially.

The polymerization starts immediately after the components have been mixed with one another. When the reaction is discontinued after 5 to 10 minutes, a grainy, filterable poly-α-methylstyrene is obtained in yields of up to 70%. The yield can be increased to approximately 85% by allowing the reaction to proceed for another period of 30 to 60 minutes.

The polymerization reaction is most advantageously carried out by introducing the reactants into a vessel containing nitrogen, argon or another inert gas. Since the reaction proceeds with the evolution of heat, cooling is advantageous for avoiding agglomeration of the precipitated poly-α-methylstyrene which would lead to the following filtration being rendered difficult. Moreover, the yield and the RSV value decrease at an elevated temperature.

The process according to the invention can, however, also be carried out continuously by removing the polymer formed from the reactor in a continuous manner and, at the same time, separately introducing the aliphatic hydrocarbon, the polymerization accelerator, the co-accelerator, the sodium dispersion (or sodium dissolved in the accelerator+coaccelerator) and the α-methylstyrene. There may be used as reaction space, for example, a tube into which the reactants are introduced at one end, while the conversion products are discharged at the other end. It is thus possible to adjust any desired reaction time by varying the volume of the tube and the rate of flow.

The RSV values indicated in the examples following hereunder are determined by way of comparing the efflux time of a 1% benzenic solution of the polymer ($t_1$) with that of pure benzene ($t_0$).

$$RSV = \frac{t_1}{t_0} - 1$$

The process of the invention displays the well-known advantages of a precipitation polymerization, i.e. the poly-α-methylstyrenes are obtained in a fine-grained form, which means that they are easy to stir and readily filterable. It is possible, moreover, to transform α-methylstyrenes into high-molecular weight polymers within 5 to 10 minutes; when working according to the mass- or solution polymerization processes discussed at the head of this disclosure, several hours or days are required. After interruption of the polymerization by the addition of, for example, a small amount of alcohol or by the introduction of air, the polymer can be obtained by simply filtering off the solvent.

Since there are only required very low amounts of catalyst, it is not necessary to remove the conversion products of the remaining catalyst after the reaction has been interrupted. An unreacted residue of the monomer is dissolved in the solvent and is removed together with the latter. Dissolution and reprecipitation of the polymer obtained is not necessary in most cases. It is not necessary to work up the solvent mixtures unless additives were used having a dissolving action upon low-molecular weight polymer-portions to be separated.

The following examples illustrate the invention.

EXAMPLES 1 TO 10 (CF. TABLE)

0.075 g. of sodium, dispersed in about 0.1 g. of mineral oil, was at least partially dissolved in a mixture composed of 2.5 cc. or 1.25 cc. of hexamethyl phosphoric acid triamide (column b) and the co-catalyst (column c). This solution was introduced dropwise into a mixture composed of 150 cc. of heptane and the co-accelerator (column d); a sodium dispersion had cooled to the temperatures indicated in column (e), 50 ml. of α-methylstyrene were added thereto and the temperature ranges enumerated in column (e) were maintained by cooling externally. After 30 minutes, the reaction was stopped by the addition of a small amount of methanol, the poly-α-methylstyrene which had precipitated in the form of fine grains was filtered off, washed with heptane and dried at 150° C. The yield obtained and the RSV values are enumerated in columns (f) and (g).

$n$ being an integer from 1 to 6, or tertiary 5- or 6-membered cyclic or heterocyclic mono- or polyvalent amines, in which the N-atom is substituted with R, and (c) compounds of trivalent phosphorus of the formula $$PR_3 \text{ or } P[N(R)_2]_3$$

in which R represents identical or different alkyl- or alkenyl radicals containing 1 to 8 carbon atoms, or aryl- or alkaryl radicals containing 6 to 10 carbon atoms, at temperatures within the range of from −20° to +40° C.

TABLE

| No. | Phosphoric acid amide, cc. | C. accelerator | Cc. | C. accelerator | Cc. | Temperature | Yield, g. | RSV value |
|---|---|---|---|---|---|---|---|---|
| a | b | c | | d | | e | f | g |
| 1 | 2.5 | Vinyl ethyl ether | 2.5 | Vinyl ethyl ether | 20.0 | 0/+4 | 17.3 | 1.53 |
| 2 | 1.25 | ___do___ | 3.75 | ___do___ | 5.0 | (+2)+12/+20 | 22.1 | 0.64 |
| 3 | 1.25 | ___do___ | 3.75 | ___do___ | 30.0 | +2/+7 | 28.7 | 1.24 |
| 4 | 1.25 | Diethyl ether | 3.75 | | | (+2)+15/+20 | 19.7 | 0.53 |
| 5 | 1.25 | Triethyl amine | 3.75 | Triethyl amine | 15.0 | (+2)+10/+20 | 25.3 | 0.62 |
| 6 | 1.25 | N-methyl morpholine | 3.75 | N-methyl morpholine | | +2/+9 | 29.8 | 0.47 |
| 7 | 1.25 | ___do___ | 3.75 | ___do___ | 10.0 | +2/+7 | 36.4 | 0.34 |
| 8 | 2.5 | N,N,N′,N′tetramethyl-1,2-diaminoethane | 2.5 | N,N,N′,N′tetramethyl-1,2-diaminoethane | 7.5 | 0/+4 | 27.3 | 0.55 |
| 9 | 2.5 | ___do___ | 2.5 | ___do___ | 17.5 | 0/+4 | 34.2 | 0.32 |
| 10 | 2.5 | Vinyl ethyl ether | 2.5 | Tri-n-butylphosphine | 15.0 | +1/+4 | 26.7 | 0.35 |

¹ (+2)+12/12/20 means that the temperature was +2° at the beginning of the test at which temperature, however, no reaction or only a slight reaction set in. After raising the temperature, polymerization set in at +12°; the maximum reaction temperature was +20° C.

We claim:

1. A process for the preparation of poly-α-methylstyrene by polymerizing α-methylstyrene, which may be substituted, by precipitation, the α-methylstyrene corresponding to the formula

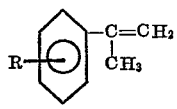

in which R represents H, CH$_3$, C$_2$H$_5$ or CH(CH$_3$)$_2$, which comprising polymerizing a mixture comprising (1) the monomer,
(2) a hydrocarbon which is inert to alkali metals and in which the poly-α-methylstyrenes do not dissolve or dissolve only to a small degree,
(3) a finely divided alkali metal or a mixture of at least two finely divided alkali metals having a particle size of less than 1 mm. in an amount within the range of from 0.5 to 200 millimoles,
(4) as accelerator, from 0.05 to 10% by volume, calculated on the mixture of hydrocarbon, accelerator and co-accelerator, of a phosphoric acid amide corresponding to the formula O=P[N(R)$_2$]$_3$, in which R represents identical or different alkyl radicals containing 1 to 10 carbon atoms, or aryl or alkaryl radicals containing 6 to 10 carbon atoms, and in which also two radicals bound to one and the same N-atom may form a carbon chain, and
(5) as co-accelerator, from 0.05 to 30% by volume, calculated on the mixture of hydrocarbon, accelerator and co-accelerator, of at least one compound of at least one of the following
   (a) vinyl ethyl ether
   (b) tertiary amines of the formula NR$_3$ or $$R_2N—(CH_2)_n—NR_2$$

at temperatures within the range of from −20° to +40° C.

2. The process as claimed in claim 1, in which the finely divided alkali metal or the mixture of at least two finely divided alkali metals are used in an amount within the range of from 2.0 to 40 millimoles per mole of the monomer.

3. The process as claimed in claim 1, in which R in the formula O=P[N(R)$_2$]$_3$ for the phosphoric acid amide represents the methyl radical.

4. The process as claimed in claim 1, in which $n$ in the formula NR$_3$ or R$_2$N—(CH$_2$)$_n$—NR$_2$ for the tertiary amines is 2.

5. The process as claimed in claim 1, in which R in the formula PR$_3$ or P[N(R)$_2$]$_3$ for the compounds of the trivalent phosphorus represents identical or different alkyl- or alkenyl groups containing 1 to 4 carbon atoms.

6. The process as claimed in claim 1, in which the polymerization is carried out at temperatures within the range of from −10° to +30° C.

7. The process of claim 1 wherein the concentration of the accelerator is from 0.1 to 5% by volume.

8. The process of claim 1 wherein the concentration of the co-accelerator is from 0.9 to 20% by volume.

References Cited

UNITED STATES PATENTS

| 3,169,948 | 2/1965 | Hardy | 260—88.2 |
| 3,288,872 | 11/1966 | House | 260—84.7 |
| 3,402,160 | 9/1968 | Hayes | 260—93.55 |

JAMES A. SEIDLECK, Primary Examiner

U.S. Cl. X.R.

252—430